United States Patent
Kerr et al.

(10) Patent No.: US 6,691,071 B2
(45) Date of Patent: Feb. 10, 2004

(54) SYNCHRONIZING CLOCK ENABLEMENT IN AN ELECTRONIC DEVICE

(75) Inventors: John S. Kerr, Chicago, IL (US); Bokchain Koh, Crystal Lake, IL (US); Arthur C. Leyh, McHenry, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/144,613

(22) Filed: May 13, 2002

(65) Prior Publication Data

US 2003/0212531 A1 Nov. 13, 2003

(51) Int. Cl.[7] ............................................. G06F 15/00
(52) U.S. Cl. ...................... 702/188; 455/352; 713/400
(58) Field of Search ............................ 702/57, 79, 89, 702/122, 124–125, 176–178, 186–188; 455/403, 502, 151.1, 352; 713/320, 322–323, 400

(56) References Cited

U.S. PATENT DOCUMENTS

| | | | | |
|---|---|---|---|---|
| 5,694,392 A | * | 12/1997 | Gaglione et al. ............ 370/337 |
| 5,950,120 A | * | 9/1999 | Gardner et al. ........... 455/343.1 |
| 6,088,602 A | * | 7/2000 | Banister ...................... 455/574 |
| 6,119,015 A | * | 9/2000 | Eun ............................ 455/502 |
| 6,138,245 A | * | 10/2000 | Son et al. .................... 713/400 |
| 6,212,398 B1 | * | 4/2001 | Roberts et al. ............. 455/502 |
| 6,243,372 B1 | * | 6/2001 | Petch et al. ................. 370/350 |
| 6,272,118 B1 | * | 8/2001 | Wewers et al. ............. 370/330 |
| 6,405,027 B1 | * | 6/2002 | Bell ............................ 455/403 |
| 6,466,553 B1 | * | 10/2002 | Wakamatsu ................ 370/311 |
| 6,483,825 B2 | * | 11/2002 | Seta ............................ 370/335 |
| 6,542,754 B1 | * | 4/2003 | Sayers et al. ............... 455/502 |
| 6,553,336 B1 | * | 4/2003 | Johnson et al. ............. 702/188 |

* cited by examiner

*Primary Examiner*—Marc S. Hoff
*Assistant Examiner*—Mary Catherine Baran
(74) *Attorney, Agent, or Firm*—Brian M. Mancini

(57) ABSTRACT

A method of synchronizing enablement of a common clock for a main and a second processor in an electronic device having a low-power mode includes a first step of completing a communication activity by the main processor. A next step includes monitoring a clock enable signal from the second processor. A next step includes comparing the timing of the second processor with the known timing of the main processor if the second processor does not have the clock enabled in the monitoring step. A next step includes calculating the the timing needed to synchronize the clock enablement by the second processor to that of the main processor. A next step includes powering up and powering down the second processor under control by the main processor to synchronize the periodic timing of the second processor to that of the main processor.

20 Claims, 4 Drawing Sheets

SYNCHRONIZING CLOCK ENABLEMENT IN AN ELECTRONIC DEVICE

FIELD OF THE INVENTION

The present invention relates generally to electronic devices such as portable radiotelephones. More particularly, the present invention is directed to operating a communication device to reduce current drain.

BACKGROUND OF THE INVENTION

In a battery-operated device, such as a portable communication device, methods can be utilized to put the device in a low power mode and reduce current drain so that the battery charge lasts longer. In a wideband code division multiple access (W-CDMA) cellular communication system, one technique involves entering a low power or "sleep" mode where much of the hardware is shutdown and the high-speed clock is turned off. The clock source requires significant power to operate, and circuits consume more current as the driving clock speed increases. Many microprocessor-based products other than WCDMA devices have similar states they enter where certain hardware portions and clocks are powered off and must be powered on and become stable before the system can operate again. For example, wireless local area networks, such as Bluetooth™ processors can turn off portions of themselves in accordance with low power mode instructions. In regards to communication functions, an idle mode can be defined for a battery-operated mobile radio, such as a cellular radiotelephone. In this mode, when the radiotelephone is in the idle mode (i.e., not engaged in a call), the radiotelephone does not continuously monitor a control channel but generally remains in a low power, idle state. In the idle state, the radiotelephone wakes up only during predetermined time slots to see if there is an incoming call, as indicated on a control or pagiong channel, or to process some other condition, such as a user input. The goal of low power or idle mode operation is to reduce the on time of the radio to a minimum arid to power down as much of the radio as possible during sleep periods, thereby preserving battery life.

A cellular phone is typically in an operating mode where it must periodically wake-up from deep sleep to monitor information or perform some other physical layer (layer 1) event. In addition, there are procedures followed to get into sleep mode and a procedure to get out of sleep mode. The procedures involve some delay when entering or exiting sleep mode primarily to allow the hardware to warm-up and the clock source to become stable. During these delay times, and in addition to the wake-up periods, the current drain of the phone is increased over that during a sleep mode. Therefore, not only is it desireable to reduce total on-time for the clock, it is desirable to avoid entering and exiting deep sleep and experiencing the associated additional high current drain delay times.

Today's communication devices can not only include wide area network connectivity, such as over WCDMA, but can also include wireless local area networking (WLAN). This usually involves coupling a separate processor or even a complete device, dedicated to WLAN connectivity, to an existing communication device. One result of this coupling is that the cellular processor and WLAN processor can share much of the hardware of the device, including the user interface, battery, and the clock oscillator in particular. The clock oscillator can then supply a clock signal to both processors. Either of the processors can direct the clock to wake-up from a sleep mode for a layer 1 activity for the cellular communication or for local activity. These activities are not synchronized to each other. Therefore, the clock must wake up independently to perform any particular communication at the required time. As a result, the clock oscillator enters and exits sleep mode many times, asynchronously from those times required to enter and exit sleep mode for the cellular layer 1 communication activities.

Accordingly, there is a need for a method for controlling clock sleep modes in a communication device operable in two communication systems. There is a further need to reduce the frequency of entering and exiting sleep modes, and to remain in sleep mode as long as possible.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

The present invention describes a method to control a low power mode of an electronic device. In particular, the present invention combines processor activities together to perform them during one wake-up period of the clock oscillator rather than waking up several times, once for each activity. Current drain in the communication device is thereby lowered by synchronizing clock operation to process activities together during one wake-up period, to scan for wide area network or local area network communication acitivities for example.

It is envisioned that the present invention would primarily find use in battery powered communication devices such as cellular radiotelephones. Typically, this involves a radiotelephone system with a plurality of base stations configured for radio communication with one or more mobile stations including a communication device such as radiotelephone or cellular telephone. The communication device is operable by a microprocessor and is configured to receive and transmit signals to communicate with the plurality of base stations (layer 1 events). The radiotelephone system can operate along several technology standards including Wideband Code Division Multiple Access (WCDMA), Code Division Multiple Access (CDMA), Time Division Multiple Access (TDMA), GSM, and other radiotelephone systems. The communication device is further operable by a second processor or microprocessor configured to receive and transmit signals to communicate with a local area communication system, such as a Bluetooth™ or IEEE 802.11 system.

Figure 1:
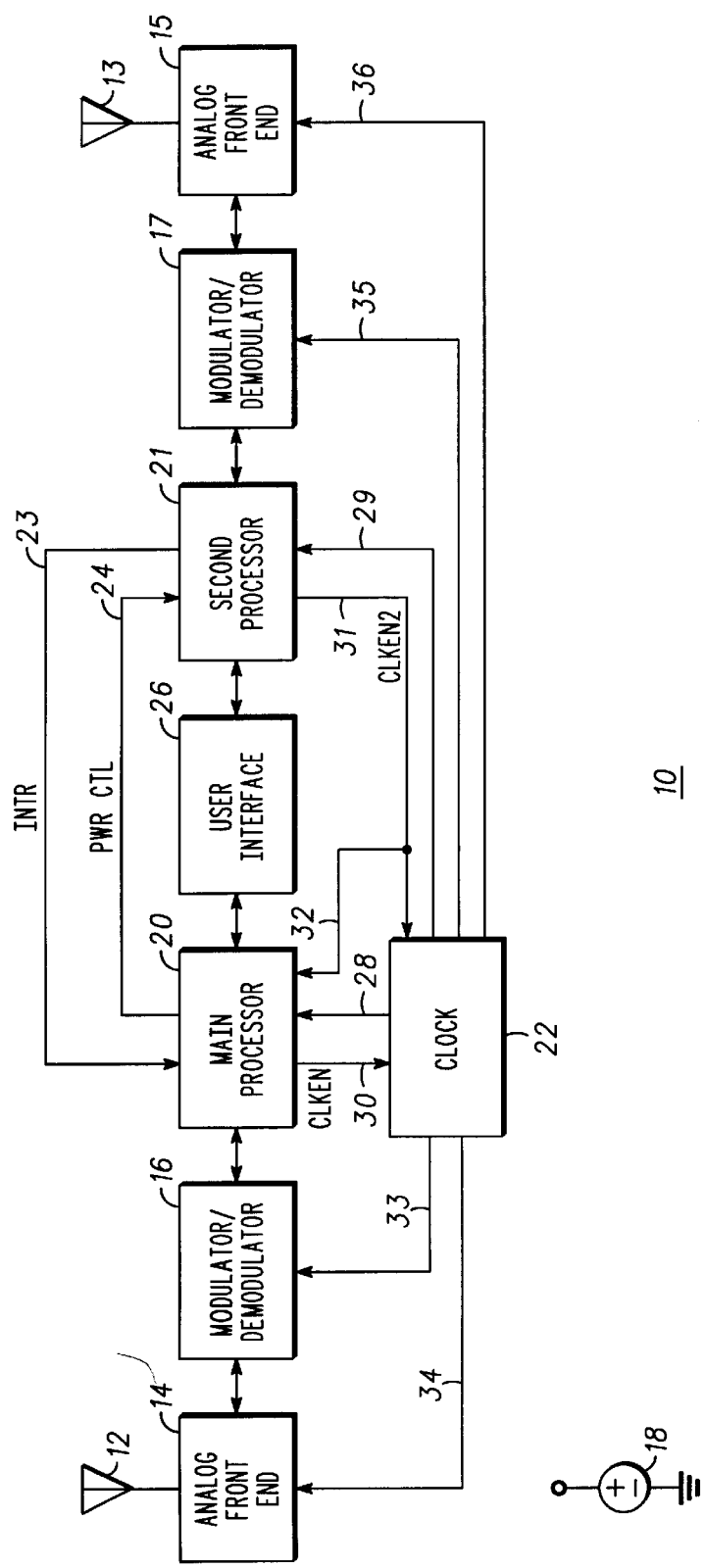
FIG. 1 is a simplified schematic diagram for clock enablement, in accordance with the present invention.

FIG. 1 shows a block diagram of an electronic device 10, in accordance with the present invention, operable on any of the radiotelephone communication systems described above. For example, the electronic device is operable on a wireless wide area network such as a typical cellular system and a wireless local area network. However, the present invention is also applicable to operation on two wide area networks or two local area networks, also. In a preferred embodiment, the present invention is applied to a WCDMA radiotelephone with a main processor 20 and a Bluetooth second processor 21. Each of the provided network communications share the use of a clock 22, a user interface 26, and a battery 18. The battery 18 provides operating power to the components of the device 10. The user interface 26 is coupled to the processors 20, 21 and permits user control of the operation of the communication device 10. The user interface 26 typically includes a display, a keypad, a microphone, an earpiece, a speaker, and the like.

Either of the processors 20, 21 can enable the clock 22 through clock enable control lines 30, 31. In effect, the enablement of the clock is provided as a logical OR function, wherein either clock enable control line 30, 31 can enable the clock 22. The clock 22 can contain high and low resolution oscillators and timers, as is known in the art. The main processor 20 also monitors, through signal line 32, the clock enablement signal on the control line 31 from the second processor 21. In addition, the main processor can direct the powering of the second processor and its associated devices through a power control line 24. Further, the second processor 21 can have limited control with the main processor operation through interrupt line 23, and the main processor will service the request according to its prioritized tasks. The main operational system of the electronic device 10 includes an antenna 12, an analog front end 14, a modulator/demodulator (modem) 16, a main processor 20, the clock 22, and the user interface 26. The antenna 12 receives RF signals from a base station or base stations in a radiotelephone system, such as WCDMA. Received RF signals are converted to electrical signals by the antenna 12 and provided to the analog front end 14. The analog front end 14 includes an RF portion including circuitry such as a receiver and transmitter, which can be powered down in sleep mode to save battery power. The analog front end 14 filters and or amplifies the signals. These analog baseband signals are then provided to the modem 16, which converts the signals to baseband streams of digital data for further processing by the processor 20 to provide the information contained in the signal to a user through the user interface 26, such as a speaker, display, and the like. This sequence is essentially reversed for transmission of signals from the communication device to the base station or base stations.

Similarly, the second operational system, such as a WLAN, of the electronic device 10 includes an antenna 13, an analog front end 15, a modulator/demodulator (modem) 17, a second processor 21, the clock 22, and the user interface 26. The antenna 13 receives signals from a local external transceiver in the local area network, for example. Received signals are converted to electrical signals by the antenna 13 and provided to the analog front end 15. It should be recognized that the antenna and analog front end can be replaced by other receiver structures such as optical receiver devices, sonic devices, and other like tranceiver devices. The analog front end 15 includes a portion including circuitry such as a receiver and transmitter, which can be powered down in sleep mode to save battery power. The analog front end 15 filters and/or amplifies the signals. These analog baseband signals are then provided to the modem 17, which converts the signals to baseband streams of digital data for further processing by the second processor 21 to provide the information contained in the signal to a user through the user interface 26, such as a speaker, display, and the like. This sequence is essentially reversed for transmission of signals from the communication device to the local area network. Optionally, the antennas 12, 13, front ends 14, 15, and modulator/demodulators 16, 17 can each be single shared units such as can be found in multi-band radiotelephones.

The processors 20, 21 control the functions of the communication device 10. The processors 20, 21 run operating systems that operate in response to stored programs of instructions and can include a memory for storing these instructions and other data. Each processor 20, 21 has a respective clock input 28, 29 for receiving a clock signal from the clock 22. The processors can also respond to interrupt signals generated internally, from the user interface 26, from external signals, or from each other 23,24.

At fixed intervals, the main processor 20 of the communication device 10 must look for calls. In the typical WCDMA system, this is at every 0.625 ms slot of a frame (16 slots per 10 ms frame) of a paging channel. Over this prescribed interval, the communication device monitors the radiotelephone system for a predetermined time slot and can be in sleep mode for the remainder of the time if the is no call. The processor 20, under timing control from the clock 22, coordinates the events in the communication device 10 required for entry into and exit from sleep mode. Such events include keeping track of system time, restarting the clock oscillator, enabling power 34 to the RF portion of the analog front end 14, and the clocking of the modem 16. For example, when the clock signal 33 is removed from the modem 16, the modem 16 enters a low power mode and all internal states are frozen. The processor 20 is coupled to other elements of the communication device 10, as should be recognized. Such connections are not shown in FIG. 1 so as to not unduly complicate the drawing figure.

The second processor 21 of the communication device 10 must also look for communications. In the Bluetooth™ system for example, scanning for pages is performed on traffics channels using a hopping frequency during prescribed intervals. However in this system, the length of time between the intervals is adjustable between zero seconds and 2.56 s (with 1.28 s as a recommended maximum). Moreover, the time at which this system enters a low power mode is arbitrary. Over this adjustable interval, the communication device periodically scans for pages on the local area network at the adjusted time interval and can be in sleep mode for the remainder of the time. The processor 21, under timing control from the clock 22, coordinates the events in the communication device 10 required for entry into and exit from sleep mode. Such events include keeping track of system time, restarting the clock oscillator, enabling power to portions of the analog front end 15, and the clocking of the modem 17, similar to the previous description for the main processor 20.

The clock 22 controls timing of the communication device 10. In particular, the clock 22 controls synchronization of local timing of the communication device 10 and system timing of the communication systems being used. The clock 22 includes a reference oscillator for generating a reference clock signal. Such oscillator is a fine resolution clock that produces a highly accurate, fine resolution clock signal such as a 15.36 MHz clock signal for example. The clock 22 is responsive to control signals 30, 31 for powering the oscillator. In response to one of the control signals 30, 31, the oscillator is selectively enabled or disabled. When enabled, the oscillator is powered up. When disabled, the oscillator enters a low power or sleep mode.

Preferably, when in the sleep mode, the clock 22 simulates system timing until end of the sleep duration determined by the processors 20, 21 using a coarse resolution clock signal, as is known in the art. The processors 20, 21 can individually determine the timing for reactivating their respective portions of communication device 10 from sleep mode. The reactivation time includes some delays including an enable oscillator time for restarting the oscillator, and a warm-up time for reactivating the RF portion of the associated analog front end. Normally, it takes a longer amount of time to power up devices of the radiotelephone than it does to power down those devices, i.e. enter sleep mode.

If there is not enough time before the next communication activity, by either processor, to enter sleep mode (i.e. not enough time to power down components and then power up components) then the clock will remain powered up. These powering up and down times typically are known, and the processors can calculate whether there is sufficient time between communication activities to enter sleep mode. If there is sufficient time for sleep mode, the processors write the time to wake-up for the next scheduled communication activity into the clock to set a timer. It should also be noted that the time to completion of any particular communication activity is not known by the processors. Therefore, only predetermined start (wake-up) times for any particular communication activity can be scheduled.

In practice, either processor can operate as a master or slave unit. The present invention is operable whenever at least one of the processors has flexibility in the scheduling of start (wake-up) events. In the case of a wide area communication system like WCDMA, GSM, etc., this flexibility is only possible when the unit is out of service and is looking for a base with which it can register. In the case of Bluetooth™ this flexibility is possible when the unit is out of service, or when it is connected as a master to another device. If both of the processors are connected to communications (i.e. Bluetooth is a slave with no control of timing, and WCMDA is camped or in a call) then the clock is operated as needed, and the present invention is not in effect.

Figure 2:
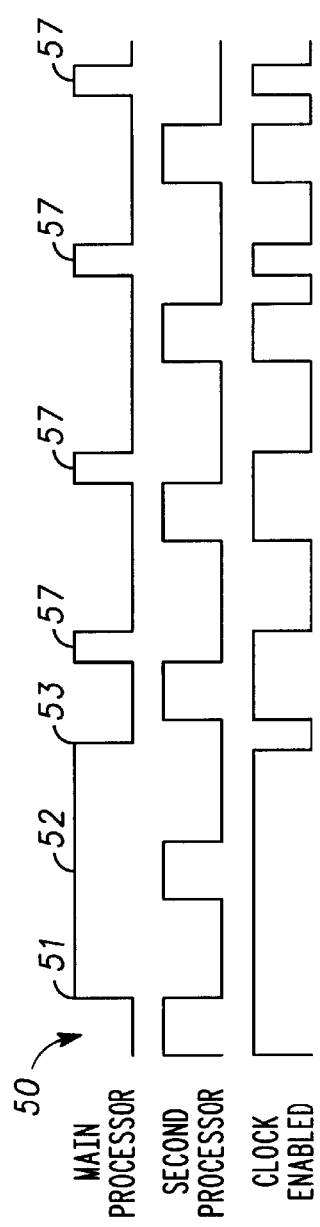
FIG. 2 is a timing diagram for prior art clock activation

FIG. 2 shows one example of timing clock enablement where each processor simply enables the clock as it needs it. The processors act independently in this mode. It should be noted that slots and times between slots of the two communication systems are not the same and are not aligned. In effect, the relationship between them is random (asynchronous). Layer 1 communication events in the radiotelephone communication system must start at periodic intervals at fixed times, e.g. the beginning of each slot in a frame. The duration of each event is determined by the base station. Therefore, the main processor does not know the duration or end time of the communication. The local area communication activities of the second processor occur at quasi-fixed times, i.e. the slot (low power) times are adjustable. For example, in the Bluetooth™ system, when the second processor is in an active link as master the slot time is dependant on the data necessary to that link, i.e. what device is connected and what transmission frequency the functionality requires. In a low power mode, the master can dictate sleep times, even greater than 2.56 s, such as for a headset link, where the sleep time could be randomly set, an extra long time would increase the delay between a user intiated call on the headset, but as long as both devices were synchronized, this would not violate the Bluetooth specification. As should be recognized, the scale of the times in this figure are for example only as WCDMA slots come much closer then Bluetooth™ slots. The end time of each active communication (i.e. the time to enter low power mode) are unknown to either the main or second processor.

In practice, if the electronic device, such as a radiotelephone, is not already awake, performing a communication activity involves leaving a sleep mode period, ramping up during a power-up period, and entering the full current wake-up period to perform the communication activity. After the communication is complete the radiotelephone can then ramp the power down to the portions of the device involved in the particular communication, along with the clock, before re-entering sleep mode where current is minimum. Normally these ramped power-up and power-down periods are short relative to the actual awake or sleep portions and are therefore not shown in the diagram. The sleep modes are timed to be in-between the fixed periodic communication events for the main processor, which cannot be altered since these are constrained (i.e. synchronized with an external device or radio communication system).

Just before the associated components of the electronic device enter sleep mode, sleep program code for the associated processor writes a time value (k-value) into the clock telling it when to wake-up for the next commnunication activity so that the timer knows when to power up the clock and necessary components. Once the communication activity is completed the associated processor can request the clock be plated back into the sleep mode by disabling the clock enable signal. However, clock disablement will only occur if there is no concurrent communication activity being performed by the other processor which will be providing its own clock enablement signal. The clock enablement signal can be provided through interface instructions, directly to a power pin or provided by either processor through an OR gate or other similar device. Preferably, the sleep program code also checks to see if the powering down time of the last communication activity overlaps the powering up time of the next communication activity. The powering-dawn and powering-up times are typically known. In a case of overlap, the clock is not allowed to sleep but stays awake until the next communication activity.

Referring to FIG. 2, mode 50 begins with the main processor (and its associated support electronics of the electronic device) in a low power or sleep mode. However, the second processor can be at the beginning of one of its communication slots (as shown) and is active (scanning for a page) and necessarily commands that the clock is enabled during this time. At the start of the layer 1 communication slot of the main processor 51, the clock (and its associated support electronics of the electronic device) are enabled. In this case the second processor had completed communication and disabled its clock enable signal, but the main processor has enabled the clock, so it therefore stays powered up. Normally, the main processor will only power itself up to monitor a paging channel for a short period to see if there are any incoming calls. In the example shown, a call is found and communication commences for an extended period 52 and does not end 53 until directed to by the base station. At this point 53, communication has ended and die main processor disables the clock, Since neither processor is sending an enable signal to the clock, the clock powers down and enters sleep mode. The main and second processor are preprogrammed to wake up at the next schedule slot beginning, as described previously. Through the rest of the diagram, each processor wakes up to monitor communication activity at the beginning of their respectuive timing intervals, but no links are made so the units are powered down within a short period. Although this is an improvement over the trivial solution of having the clock active constantly, it can be seen that the clock is enabled at enough different times that it is powered up for about half of the time.

Figure 3:
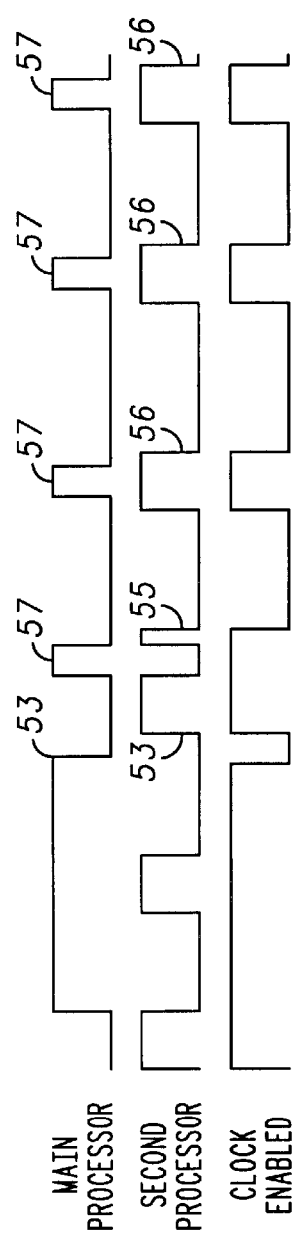
FIG. 3 is a timing diagram for synchronized clock enablement, in accordance with the present invention.

FIG. 3 demonstrates the operation of the present invention which involves synchronizing the active call monitoring periods and the low power periods of the main and second processors to maximize clock sleep time, thereby reducing battery current drain. Of course, if either of the processors is active and linked in a communication then the clock must be powered up all through those communication activities. However, when the short uptimes of call monitoring are synchronized between the two processors, battery power can be conserved. This can be achieved only in those instances where the page monitoring intervals of one or the other of the communication systems can be adjusted, such as in the Bluetooth™ communication system, for example.

As before, main processor Layer 1 monitoring falls into fixed time slots 57, with durations determined by the base station, such as in a WCDMA system. Therefore, the same main processor activity is shown in monitoring mode. However, local area network monitoring, such as in the Bluetooth™ system for example, can adjust the beginning page scan time within a small range (0 s to 2.56 s). Once set, active channel monitoring involves waking up at fixed intervals to scan for a page. As before, the time at which the Bluetooth™ system leaves active monitoring and enters low-power mode is arbitrary. For example, this happens after a power up, or at the end of an active connection. By adjusting the length of time between the oscillator wake up periods, the present invention optimizes the battery drain by the clock oscillator (and associated communication components).

When the second processor goes into low-power mode, it will disable the clock signal. The main processor also has visibility to this line (through line 32 in FIG. 1). Once the main processor has completed a communication activity 53, it can monitor the clock enable signal from the second processor and note when the second processor enables the clock 54 for its communication activity. The main processor measures the timing of the second processor and compares this with the known wake up times for itself. The main processor can then calculate the timing adjustment needed to synchronize the page scanning activity of the second processor to that of the main processor. In other words the main processor calculates the necessary clock enablement times for both itself in the second processor such that their clock enablement signals will overlap in time. Values will be chosen for start time and length between wakeups; which are dependent on the radio communication system (e.g. WCDMA) and its operational mode (.e.g. in a call, standby with various active durations, etc.) and the second processor system requirements to determine how to best synchronize the clock use. Once that calculation is made, the second processor is brought out of the low-power mode, and immediately placed back in that low power mode, to reset and synchronize 55 the periodic timing 56 of the second processor. In this way, the clock use will be optimized as it will be on for less than half the time, as shown.

After this initial synchronization 55, the second processor enables the clock independently unless something changes, for example, if there is an active commnunication in either the main processor system or the second processor system. Obviously, the main processor knows when it is in communication and it can monitor the clock enable control line from the second processor to know whether it is still in synchronization. If synchronization is disturbed it would then need to be repeated. Similarly, if the main processor is out of service, the second processor as master can tell it (through interrupt line 23 in FIG. 1) when to synchronize. It should be recognized that the processors need not be active at exactly the same time periods, but can be active at integer multiples of each others' active periods. For example, the WCDMA system can have multiple paging channel monitoring periods between each one of the Bluetooth™ page scans. However, as long as the Bluetooth™ processor page scans periodically aligns with one of the WCDMA activities, then the present invention provides benefit.

Figure 4:
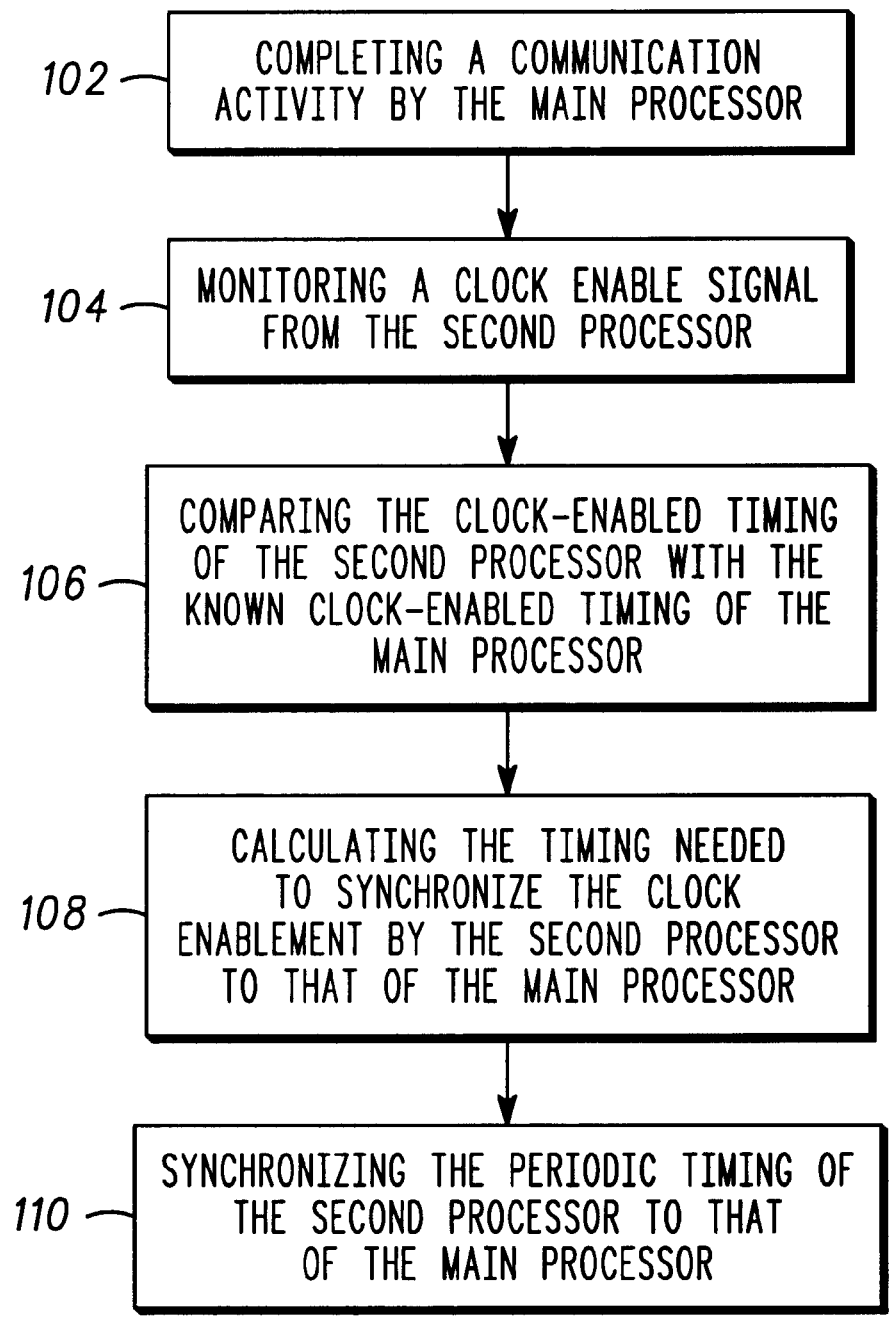
FIG. 4 is a flow chart outlining a method for synchronized clock enablement, in accordance with the present invention.

The present invention also incorporates a method 100 for synchronizing clock enablement for two processors in an electronic device, as shown in FIG. 4. The method primarily applies to microprocessor-based communication devices having a sleep mode, but can be applied to other electronic devices having a sleep mode, also. In said device there are two processors provided that are configured to periodically monitor for pages, being powered down for the remaining time. One or both of the processors has an adjustable page monitoring interval, the second processor for example.

Therefore, in operation, the method includes a first step 102 of completing a communication activity by the main processor. A next step 104 includes monitoring a clock enable signal from the second processor. When the second processor goes into low-power mode, it will disable the clock signal and this will be noticed by the main processor. Preferably, the main processor can wait until the second processor goes rip through one communication cycle to better measure its timing off the second processor does not have the clock enabled at an expected time (i.e. signaling that the second processing is not synchronized with the main processor), a next step 106 includes comparing the clock enabled timing of the second processor with the known clock enabled timing of the main processor. This can include the start timing and stop timing or duration of the second processor activity. Optionally, these characteristics can be stored in the main processor such that only start or stop timing are needed.

A next step 108 includes calculating the the timing needed to synchronize the clock enablement by the second processor to that of the main processor, such that their clock enablement signals will overlap in time. Preferably, this includes the shorter clock enablement period of either processor being totally contained within the longer clock enablement period of the other processor, thereby providing complete overlap of clock enablement. In other words, the second processor has a minimum wake up time period that is greater than a minimum wake up time period of the main processor. Preferably, this includes containing the wake up time period of the main processor totally within the wake up time period of the second processor. Alternatively, the second processor has a minimum wake up time period that is less than a minimum wake up time period of the main processor, and includes containing the wake up time period of the second processor totally within the wake up time period of the main processor. A next step 110 synchronizing the periodic timing of the second processor to that of the main processor. Preferably, this includes powering up and powering down the second processor under control by the main processor to reset the synchronization of the second processor to align with the main processor.

Preferably, the method includes a further step of detecting when an active communication is made by either of the processors, wherein the above steps are repeated. An active communication is defined as a communication by the main processor of a duration longer then the periodic control channel monitoring for a call, or whether the second processor has made an active link. It should be recognized the the roles of main processor and second processor can be reversed within the same device.

Figure 5:
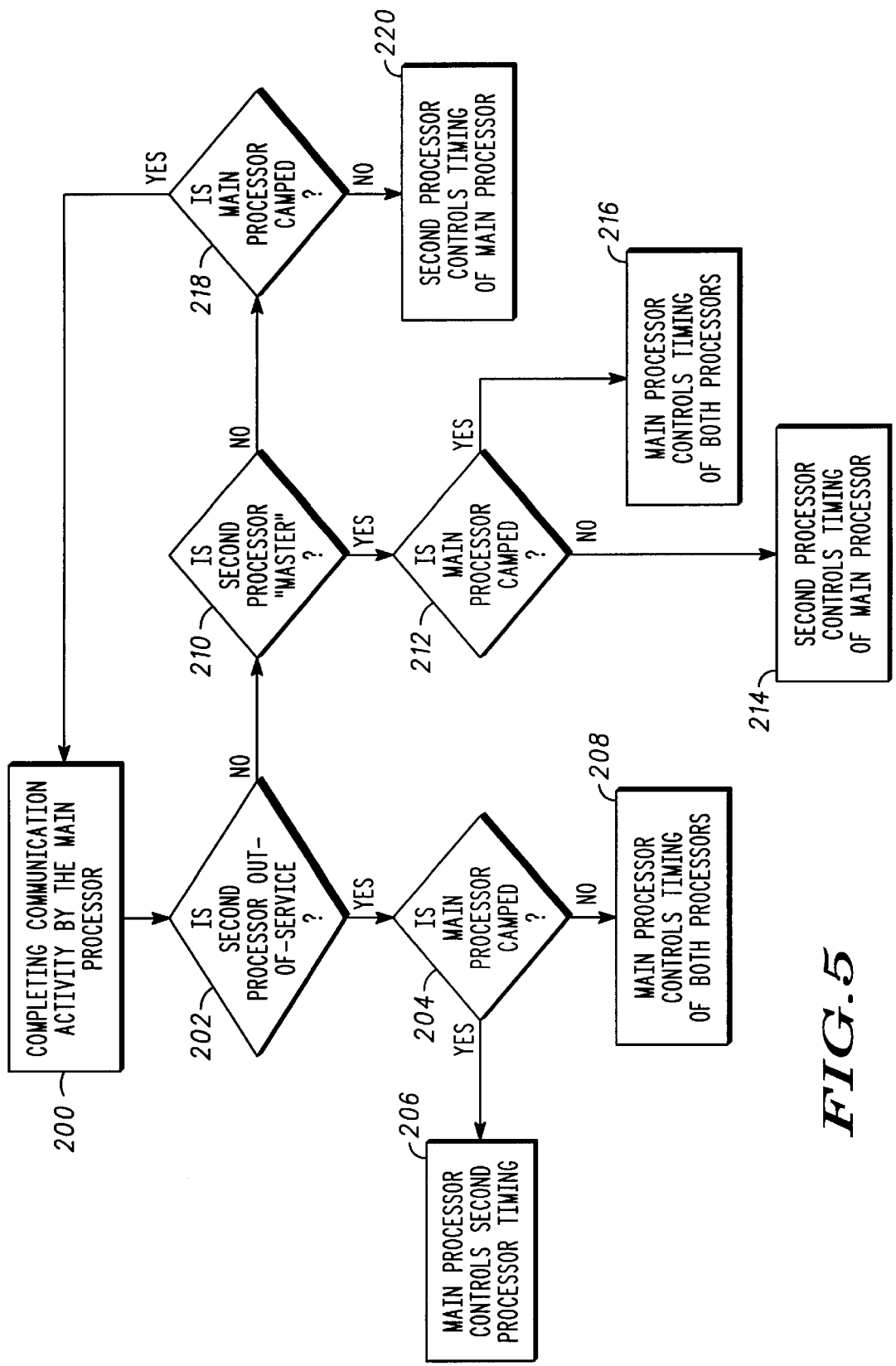
FIG. 5 is a flow chart outlining a prefered method for synchronized clock enablement, in accordance with the present invention.

A preferred method for synchronizing clock enablement for two processors in an electronic device is shown in FIG. 5. The method primarily applies to a main communication system such as WCDMA and a secondary asynchronous communication system such as Bluetooth™. Again, there are two processors provided that are configured to periodically monitor for pages, being powered down for the remaining time. Either processor can operate as a master or slave unit. In addition, with both processors out of service they are the least constrained, although Bluetooth™ is always constrained in the sense that it must wake up between 0 and 2.56s. In that scenario, both processors would synchronize to processor timing of the one whose wakeup period is shortest or the best match in terms of integer multiples. etc. For example, the WCDMA algorithm that is used to search for the system can be adjusted to match the Bluetooth™ on-times. That algorithm (i.e. how often the phone searches for an active system) is not specified by the WCDMA standard.

In practice, the main communication transceiver can be either in a camped mode or an out-of-service mode. Camped mode refers to the main communication system being connected (registered) to a communication system and the system has control of the wake-up timing (clock enablement). Out-of-service mode refers to the case where the main (or correspondingly the secondary) processor is not connected to a communication system, and the processor has control on how often it looks for a system (i.e. controls wake-up timing and clock enablement. The secondary communication transceiver can be in a master mode, slave mode, or out-of-service mode. The master mode refers to the case where the secondary (Bluetooth™) processor acts as the master unit and slaves the clock enablement according to the operational parameters of that communication system. The slave mode refers to the case where the secondary processor is connected as a slave to a master unit (main processor) and has no control over the clock enablement timing. The present invention provides for these various operational conditions as described below.

Referring to FIG. 5, the preferred method again includes a first step 200 of completing a communication activity by the main processor. A next step 202 includes determining whether the second (Bluetooth™) processor is out-of-service or active. In the case where the second processor is out-of-service (not-connected), the main processor can then provide timing control for the second processor as well as itself. This is determined in step 204, wherein if the main processor is camped (i.e. timing is set by the main communication system), the main processor can then control the timing 206 of the out-of-service second processor to synchronize with itself. If the main processor is also out-of-service then it can control 208 its timing as well as then out-of-service second processor. Alternatively, the second processor can control the timing of both processors in this step.

Going back to step 202, if the second processor is instead active, it will be determined 210 whether the second processor is in master or slave mode. If the second processor is in master mode, then it will be determined 212 if the main processor is camped or out-of-service. If camped, the main processor controls 216 timing of the second processor to be synchronous with itself. If the main processor is not camped (i.e. out-of-service), then the second processor controls 214 the timing of the main processor to be synchronous with itself (i.e. adjusting the timing that the main processor will poll for pages).

Going back to step 210, if the second processor is instead in slave mode, it will be determined 218 whether the main processor is camped or out-of-service. If camped, the main processor timing is already set by the system and the second processor is slaved thereto, and the process can repeat. However, if the main processor not camped (i.e. out-of-service), then the second processor controls 220 the timing of the main processor to be synchronous with itself (i.e. adjusting the timing that the main processor will poll for pages). In each of the above cases, the method will attempt to resynchronize the processors after the completing of a communication activity by the main processor 200.

In summary, the present invention provides the grouping together of concurrent communication activities to avoid repeated powering down and powering up the clock and to shorten the total clock on-time, thereby conserving current drain. The overall result is that multiple communication activity wake-up periods can be grouped together in a single wake-up period that can also be combined with a layer 1 communication event wake-up period. This results in a lower total on-time for the clock oscillator, or other circuitry shared by both systems, e.g. power supplies, RF front end, etc., subsequently lowering current consumption.

The invention could be implemented in all wireless/cordless phone products and portable computing devices such as PCs and PDAs to improve battery life and simplify software architecture. In particular, the invention would find benefit in all battery operated products that use a low power mode in which the current drain cost of keeping a clock oscillator powered is significant.

While the invention has been described in detail above, the invention is not intended to be limited to the specific embodiments as described. It is evident that those skilled in the art may now make numerous uses, modifications of, and departures from the specific embodiments described herein without departing from the inventive concepts.

What is claimed is:

1. A method of synchronizing enablement of a clock commonly connected to a main and a second processor both configured for wireless communication within an electronic device having a low-power mode, the method comprising the steps of:

completing a communication activity by one of the processors;

monitoring a clock enable signal from each of the processors to the common clock;

comparing the clock-enabled timing of one of the processors with the known clock-enabled timing of the other processor;

calculating the the timing needed to synchronize the clock enablement of the processors; and synchronizing the periodic timing of the processors.

2. The method of claim 1, wherein the second processor has variable power up times and the main processor has fixed periodic power up times, and wherein the synchronizing step includes powering up and powering down the second processor under control of the main processor to synchronize the timing of the processors.

3. The method of claim 2, wherein the second processor is operable in a local area network communication system, and wherein the monitoring step include monitoring a clock enable signal from the second processor and the comparing step includes the other processor being the main processor.

4. The method of claim 2, wherein the second processor has a minimum wake up time period that is greater than a minimum wake up time period of the main processor.

5. The method of claim 1, wherein the main processor is operable in a local area network communication system.

6. The method of claim 1, wherein the second processor has a minimum wake up time period that is less than a minimum wake up time period of the main processor.

7. The method of claim 1, further comprising the step of detecting when an active communication is made by either of the processors, wherein the above steps are repeated.

8. The method of claim 1, wherein after the monitoring step further comprising the step of waiting until the second processor goes through one communication cycle to measure its timing.

9. The method of claim 1, wherein the calculating step includes calculating the timing such that the clock enablement signals of the main and second processors will overlap in time.

10. The method of claim 1, wherein if the main processor is out of service, then the second processor controls the timing of the second processor unless it is out of service itself.

11. A method of synchronizing enablement of a clock commonly connected to a main processor operable in a wide area radio communication system and a second processor operable in a local area network communication system within an electronic device having a low-power mode, the method comprising the steps of:

completing a communication activity by one of the processors;

monitoring a clock enable signal from the second processor to the common clock;

comparing the timing of the second processor with the known timing of the main processor if the second processor does not have the common clock enabled in the monitoring step;

calculating the timing needed to synchronize the clock enablement by the second processor to that of the main processor; and powering up and powering own the second processor under control of the main processor to synchronize the periodic timing of the second processor to that of the main processor.

12. The method of claim 11, wherein the second processor has a minimum wake up tune period that is greater than a minimum wake up time period of the main processor.

13. The method of claim 11, wherein the second processor has a minimum wake up time period that is less than a minimum wake up time period of the main processor.

14. The method of claim 11, wherein after the monitoring step further comprising the step of waiting until the second processor goes through one communication cycle to measure its timing.

15. The method of claim 11, wherein the calculating step includes calculating the timing such that the clock enablement signals of the main and second processors will overlap in time.

16. The method of claim 11, wherein in the main processor is operable in at least one of a WCDMA, CDMA, TDMA and GSM communication system.

17. The method of claim 11, wherein in the second processor is operable in at least one of a Bluetooth™ and IEEE 802.11 communication system.

18. A method of synchronizing enablement of a clock commonly connected to a main processor operable in a wide area radio communication system and a second processor operable in a local area network communication system within an electronic device having a low-power mode, the method comprising the steps of:

completing a communication activity by the main processor;

monitoring a clock enable signal from the second processor to the common clock;

waiting until the second processor goes through one communication cycle before measuring its timing;

comparing the timing of the second processor with the known timing of the main processor if the second processor does not have the common clock enabled in the monitoring step;

calculating the the timing needed to synchronize the clock enablement by the second processor to that of the main processor;

powering up and powering down the second processor under control of the main processor to synchronize the periodic timing of the second processor to that of the main processor; and detecting when an active communication is made by either of the processors, wherein all the above steps are repeated.

19. The method of claim 18, wherein the second processor has a minimum wake up time period that is greater than a minimum wake up time period of the main processor.

20. The method of claim 19, wherein the calculating step includes calculating the timing such that the clock enablement signals of the main and second processors will overlap in time.

\* \* \* \* \*

UNITED STATES PATENT AND TRADEMARK OFFICE
CERTIFICATE OF CORRECTION

PATENT NO. : 6,691,071 B2 Page 1 of 1
DATED : February 10, 2004
INVENTOR(S) : Kerr, John S. et al.

It is certified that error appears in the above-identified patent and that said Letters Patent is hereby corrected as shown below:

Column 11,
Line 37, change "powering own" to -- powering down --

Signed and Sealed this

Twenty-fifth Day of May, 2004

JON W. DUDAS
*Acting Director of the United States Patent and Trademark Office*